United States Patent [19]

Shimizu et al.

[11] 3,872,163

[45] Mar. 18, 1975

[54] METHOD OF PREPARING 1,4-DIACYLOXY-2-BUTENES

[75] Inventors: Tohru Shimizu; Teruo Yasui; Sieshiro Nakamura, all of Kurashiki City, Japan

[73] Assignee: Kuraray Co., Ltd., Kurashiki City, Japan

[22] Filed: Jan. 19, 1972

[21] Appl. No.: 219,146

[52] U.S. Cl. ............................ 260/491, 260/497 A
[51] Int. Cl. ............................................. C07c 67/04
[58] Field of Search ...................... 260/497 A, 491

[56] References Cited
UNITED STATES PATENTS

| | | | |
|---|---|---|---|
| 3,190,912 | 6/1965 | Robinson ...................... | 260/497 A |
| 3,275,680 | 9/1966 | Holzrichter et al. ............ | 260/497 A |
| 3,642,878 | 2/1972 | Motlein et al. ................. | 260/497 A |
| 3,647,892 | 3/1972 | Hoch ............................. | 260/497 A |
| 3,670,014 | 6/1972 | Fernholz et al. ............... | 260/497 A |
| 3,671,577 | 6/1972 | Ono et al. ..................... | 260/497 A |

FOREIGN PATENTS OR APPLICATIONS

| | | | |
|---|---|---|---|
| 1,957,996 | 6/1970 | Germany ......................... | 260/491 |
| 771,193 | 11/1967 | Canada ........................... | 260/497 A |
| 1,138,366 | 1/1969 | Great Britain .................. | 260/497 A |
| 2,012,903 | 10/1970 | Germany ......................... | 260/497 A |

OTHER PUBLICATIONS

Nakamura et al. Syn Commun. 1971, 1(2) 137–139 abstract only – Vol. 75 109, 800 (CA).

*Primary Examiner*—Lorraine A. Weinberger
*Assistant Examiner*—Richard O. Kelly
*Attorney, Agent, or Firm*— Kramer & Kaufman

[57] ABSTRACT

A method for preparing 1,4-diacyloxy-2-butenes which comprises reacting at least one unsaturated compound selected from the group consisting of butene-1, cis-butene-2, trans-butene-2, 1-acyloxy-2-butene, 1-acyloxy-1,3-butadiene and butadiene with a carboxylic acid and oxygen in the presence of an effective amount of a catalyst containing palladium.

4 Claims, No Drawings

METHOD OF PREPARING 1,4-DIACYLOXY-2-BUTENES

This invention relates to a method of preparing 1,4-diacyloxy-2-butenes by reacting at least one unsaturated compound selected from a group consisting of butene-1, cis-butene-2, transbutene-2, 1-acyloxy-2-butene, 1-acyloxy-1,3-butadiene and butadiene (which members are hereinafter referred to as starting-unsaturated-compounds), oxygen and a carboxylic acid in the presence of a palladium catalyst, and it also relates to a method of preparing 2-butene-1,4-diol by hydrolyzing said 1,4-diacyloxy-2-butene.

It is well known that when an olefin is reacted with oxygen and a carboxylic acid in the presence of a palladium catalyst, a carboxylic acid ester of an unsaturated monohydric alcohol can be produced, without accompanying saturation of an olefinic double bond. Said ester has a structure wherein hydrogen attached to carbon atoms having a double bond or a carbon atom in the α-position to the double bond in the olefin molecule is replaced by an acyloxyl radical. For example, a vinyl carboxylate is formed from ethylene by the reaction represented by the equation (1); and an allyl carboxylate is formed from propylene by the reaction represented by the equation (2).

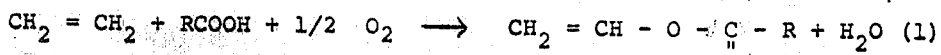

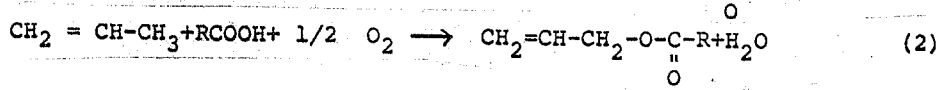

In equations (1) and (2), R stands for a hydrocarbon radical.

However, notwithstanding many reports concerning the preparation of the unsaturated monohydric alcohol esters from ethylene and propylene, it is not known that an olefin having more than three carbon atoms can be reacted with oxygen and a carboxylic acid to produce a carboxylic acid diesters of an unsaturated diol.

2-butene-1,4-diol has been hitherto produced by hydrogenating 2-butyne-1,4-diol which is obtained from the reaction of acetylene and formaldehyde. In this method, not only are raw materials expensive, but also the processes are complicated and many unwanted by-products are produced.

The present invention provides a reaction wherein n-butenes or butadienes, oxygen and a carboxylic acid are reacted in the presence of a palladium catalyst. It is now found that 1,4-diacyloxy-2-butene can be produced by conducting the reaction using butene-1, cis-butene-2, trans-butene-2 or butadiene as the starting-unsaturated-compound. Further, it has been found that 1,4-diacyloxy-2-butene can be produced from 1-acyloxy-2-butene or 1-acyloxy-1,3-butadiene by reacting the said compound with oxygen and a carboxylic acid. Butadiene is the most preferred starting-unsaturated-compound. When butadiene is used as the starting-unsaturated-compound, 1,4-diacyloxy-2-butene can be obtained in a particularly high yield, with a better selectivity, and lower production of by-products.

Further, the said 1,4-diacyloxy-2-butene can be easily hydrolyzed to 2-butene-1,4-diol. Therefore, when 2-butene-1,4-diol is produced from the starting-unsaturated-compound via 1,4-diacyloxy-2-butene in accordance with the method of the present invention, the raw materials to be used are of low cost and the operations are simple, as compared with those in known methods.

The carboxylic acid which is used as one of the starting compounds in the present invention is a monocarboxylic acid having the general formula RCOOH wherein R is a hydrocarbon radical of 1–18 carbons, preferably 1–8 carbons, and preferably an aliphatic monocarboxylic acid represented by the general formula R'COOH in which R' is an alkyl group of 1–18, and preferably 1–8 carbons. It is desirable to use acetic acid, propionic acid or butyric acid, acetic acid being most preferable. 1-acyloxy-2-butene and 1-acyloxy-1,3-butadiene used in the present invention are represented by the general formulae:

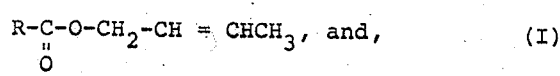

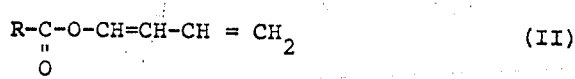

wherein R has the above-mentioned meaning. In carrying out the acyloxylation reaction of the present invention, the suitable molar ratio of starting-unsaturated-compound/carboxylic acid is in the range of from 10/0.1 – 10/100, and is preferably 10/0.5 – 10/20.

When butadiene is reacted with oxygen and a carboxylic acid in accordance with the present invention, a small amount of 3,4-diacyloxy-1-butene and considerable amounts of monoacyloxy-1,3-butadiene are by-produced in addition to the main product, 1,4-diacyloxy-2-butene. Among these by-products, 1-acyloxy-1,3-butadiene can be readily converted into 1,4-diacyloxy-2-butene by recycling it to the reaction. In this case said 1-acyloxy-1,3-butadiene can be supplied to the reaction system either after being isolated from the reaction product mixture or together with the other by-product(s), for example, with 2-acyloxy1,3-butadiene.

As is apparent from the foregoing, in case wherein 1,4-diacyloxy-2-butene is synthesized by the reaction of butadiene, oxygen and a carboxylic acid in the presence of the palladium catalyst, an additional amount of 1,4-diacyloxy-2-butene can be obtained by contacting the by-product 1-acyloxy-1,3-butadiene or the 1-acyloxy-1,3-butadiene-containing fraction (for example, a fraction having a boiling point range of from about 100°C. to about 130°C. under atmospheric pressure) with a carboxylic acid, and oxygen, if necessary. When 1-acyloxy-1,3-butadiene or 1-acyloxy-1,3-butadiene-containing fraction is recycled to the reaction as mentioned above, the amount of the 1-acyloxy-1,3-butadiene or the 1-acyloxy-1,3-butadiene-containing fraction to be supplied to the reaction system is in the range of from about 0.1 to 100 moles per mole of carboxylic acid, preferably 0.5 to 20 moles per mole of carboxylic acid, calculated as the amount of 1-acyloxy-1,3-butadiene or calculated as the amount of sum of the 1-acyloxy-1,3-butadiene and butadiene when butadiene is supplied to the reaction system together with the 1-acyloxy-1,3-butadiene or the 1-acyloxy-1,3-butadiene-containing fraction.

When n-butenes are reacted with oxygen and a carboxylic acid in accordance with this invention, 1-acyloxy-2-butene and 1-acyloxy-1,3-butadiene is by-produced in addition to the main product, 1,4-diacyloxy-2-butene. These by-products can be readily converted into 1,4-diacyloxy-2-butene by the same operation as above-mentioned.

When butadiene is reacted with oxygen and a carboxylic acid in gaseous phase according to the present invention, it is desirable that the concentration of butadiene in the gaseous mixture to be fed into the reaction system is controlled in the range of less than 20 mole %, preferably less than 15 mole %, especially preferably in the range of from 5–15 mole %, because high concentrations of butadiene accelerates a decrease in the catalytic activity during the reaction. In this case, it is further desirable that vaporized water is added to the reaction gas in a concentration of more than 5 mole %, preferably 10–50 mole %, to prevent a decrease in catalytic activity during the reaction.

The palladium catalyst used in the invention is a catalyst system containing at least palladium as a main component. Palladium may be unsupported or supported on a suitable carrier material, such as alumina, silica, silica-alumina, carbon, pumice or the like, preferably alumina or silica. When palladium is supported on a carrier, the concentration of palladium is usually in the range of from 0.1 – 5%, preferably 0.5–2% by weight, based on the weight of the carrier. In order to carrying out more effectively the reaction for preparing 1,4-diacyloxy-2butene, it is desirable to use a carboxylic acid salt of an alkali metal such as lithium, sodium or potassium as a promotor. In the aforementioned promotor, a carboxylic acid salt of potassium is especially superior. These alkali metal salts of carboxylic acids are usually supported on the carrier, but, when the reaction, according to this invention, is carried out in the gaseous phase, a portion of the alkali metal salt may be introduced into the reaction zone together with reactants. Further, in the case of carrying out the reaction using the carboxylic acid in the liquid state, the alkali metal salt of the carboxylic acids can be added to the carboxylic acid. The amount of the carboxylic acid salt supported on the carrier is preferably in the range of from about 0.3–10% by weight, based on the weight of the carrier. It is desirable that the carboxylic acid used to form the alkali metal salt corresponds to the carboxylic acid used as the raw material.

In the present invention, it is permitted to use oxides and/or carboxylates of metals such as zinc, titanium, bismuth, cadmium, manganese or the like as a reinforcing material for the carrier or as a promotor in addition to the carboxylic acid salt. The use of these metal compounds leads to more desirable results.

For preparing 1,4-diacyloxy-2-butene in accordance with the present invention, many procedures can be employed; for example, (1) the reaction may be carried out in the gaseous phase by passing a gaseous mixture containing a starting-unsaturated-compound, oxygen and a carboxylic acid, or a diluted gaseous mixture thereof with gases which are inert in the reaction conditions, such as nitrogen, carbon dioxide and the like over the palladium catalyst; (2) the reaction may be carried out by trickling a liquid carboxylic acid downwardly over the fixed catalyst in the reaction chamber, while feeding downwardly in the reaction chamber a starting-unsaturated-compound and an oxygen-containing gas or oxygen; (3) the reaction may be carried out by contacting a starting-unsaturated-compound and oxygen with a liquid carboxylic acid containing fine particles of palladium with stirring.

The gaseous phase method (1) is preferably used because the operation is easy and high yields can be obtained.

The amount of oxygen contained in the gaseous mixture which is supplied to the reaction is preferably in the range of 2–10% by volume, based on the total volume of the gaseous mixture, to avoid the risk of explosion. Where a carboxylic acid in the liquid state is used, the amount of oxygen to be supplied can be varied over a wide range, but is preferably in the range of about 1–100 liters per liter of catalyst per hour (=1–100 liters/liter of catalyst.hour), preferably 3–50 liters per liter of catalyst per hour. Oxygen may be diluted with diluting gases such as nitrogen, carbon dioxide and the like. Saturated hydrocarbons such as propane, butane and the like may be presented in the starting-unsaturated-compound and they do not adversely affect the progress of the reaction. It is, however, preferred that the concentrations of said saturated hydrocarbons are as small as feasible.

The reaction for preparing 1,4-diacyloxy-2-butene according to the invention can be carried out at temperatures greater than 50°C., preferably in the range of from 80° to 200°C. and most preferably from 100° to 160°C. When the reaction temperature is too high, triester production increases. Suitable reaction pressures are determined in accordance with the method of reaction and the reaction temperature. For example, the pressure in the gaseous phase reaction is preferably 20 atmospheres or less, especially in the range of from atmospheric pressure to 10 atmospheres. When the reaction is carried out in gaseous phase, the space velocity is such that the flow rate of the reaction gas is in the range of from 300–1,500 parts by volume per part by volume of catalyst per hour, suitably 500–1,000 parts by volume per part by volume of catalyst per hour.

In the present invention, any one of many conventional spearation procedures can be employed to separate 1,4-diacyloxy-2-butene from the mixture containing the reaction products. For instance, when the reaction is carried out in the gaseous phase, components in the gaseous reaction mixture capable of being condensed comparatively easily, succh as a carboxylic acid, 1,4-diacyloxy-2-butene, 1-acyloxy-2-butene, 1-acyloxy-1,3-butadiene, 3,4-diacyloxy-1-butene, water and the like, are condensed by cooling the gaseous reaction mixture, effusing from the reaction zone. Thereafter, by heating the condensate under atmospheric pressure or, if necessary under reduced pressure, components such as water, carboxylic acid, 1-acyloxy-2-butene, 1-acyloxy-1,3-butadiene and the like are distillated out, while the mixture containing 1,4-diacyloxy-2-butene and 3,4-diacyloxy-1-butene is obtained as a bottoms product.

When the reaction is carried out in liquid phase, on the other hand, by heating the liquid reaction mixture under atmospheric pressure or, if necessary, under reduced pressure, components such as water, carboxylic acid, 1-acyloxy-2-butene, 1-acyloxy-1,3-butadiene and the like are distilled out, while the mixture containing 1,4-diacyloxy-2-butene and 3,4-diacyloxy-1-butene is obtained as a bottoms product. 1,4-diacyloxy-2-butene can be obtained by a conventional distillation from the aforementioned mixture.

1,4-diacyloxy-2-butene can be used, for example, for a solvent and for preparing 2-butene-1,4-diol by hydrolysis thereof.

Further, the mixture containing 1,4-diacyloxy-2-butene and 3,4-diacyloxy-1-butene can be subjected to hydrolysis, whereby 2-butene-1,4-diol and 1-butene-3,4-diol are produced. 1-acyloxy-2-butene and 1-acyloxy-1,3-butadiene which are separated from the distillate obtained by the distillation of the aforementioned condensate, or liquid mixture of reaction products, can be recycled to the reaction system for preparing 1,4-diacyloxy-2-butene. The ureacted n-butenes recovered can be also recycled to the reaction system. When 3-acyloxy-1-butene is by-produced in the reaction for preparing 1,4-diacyloxy-2-butene, the recovered 3-acyloxy-1-butene can be recycled to the reaction because the 3-acyloxy-1-butene can be isomerized to 1-acyloxy-2-butene in the presence of the palladium catalyst.

In the present invention, the hydrolysis of 1,4-diacyloxy-2-butene or the mixture containing 1,4-diacyloxy-2-butene and 3,4-diacyloxy-1-butene can be carried out, optionally by converting organic esters to corresponding alcohols and organic acids, for example, by: (1) hydrolysis with the aid of an alkaline catalyst, (2) hydrolysis with the aid of an acid catalyst and (3) ester-interchange reaction with a monohydric alcohol such as methanol.

Of these methods, the method of hydrolysis with the aid of an alkaline catalyst and the method employing an ester-interchange reaction, are comparatively wasteful. For preparing above-mentioned diol-compounds economically, it is desirable to hydrolyze the above-mentioned diester-compounds by the use of the acid catalyst, followed by separation of the produced corresponding diol-compounds by a distillation or an extraction method. One advantageous method is one in which, while adding water into a reaction mixture during the hydrolysis reaction or after the reaction, the mixture is heated to distill the produced carboxylic acid with water. Another advantageous method is one in which a carboxylic acid produced in the hydrolysis is extracted out of the mixture of hydrolysis reaction mixture, while the raffinate containing water and diol-compounds is distilled to obtain a desired diol-compound. When diacetoxybutenes are hydrolyzed, a solvent such as diisopropylether is used as an extractive solvent. When the mixture containing 2-butene-1,4-diol and 1-butene-3,4-diol is obtained by the aforementioned procedures, both compounds can be easily separated by, for example, distillation. When 1,4-diacyloxy-2-butene and 3,4-diacyloxy-1-butene are hydrolyzed in the presence of the acid catalyst it is desirable to stir the reaction mixture to contact sufficiently the above-mentioned diacyloxybutenes with water because these compounds are only slightly water soluble. As an acid catalyst, hydrochloric acid, nitric acid, sulphuric acid, cation exchange resins or the like is used; however, sulphuric acid is especially preferred. The amount of the acid catalyst used for the hydrolysis is preferably in the range of from about 0.02 – 2% by weight, based on the total weight of diacyloxy-butenes and water. Though the ratio of diacyloxybutenes and water to be mixed can be widely varied in accordance with the reaction conditions, it is suitable to use about 2–30 moles, preferably 5–20 moles, of water per mole of the ester linkage in the diacyloxybutenes from the viewpoints of conversion and readiness of separation. The temperature at which the hydrolysis is carried out can be varied over a wide range, but it is suitable to use room temperature or a higher temperature. It is preferred to use temperatures of, at least, 50°C., and especially 80°–150°C. The hydrolysis can be carried out in batchwise or continuous manner. 2-butene-1,4-diol obtained by the hydrolysis is useful as a raw material for preparation of unsaturated polyesters or tetrahydrofuran.

The invention will be described in more detail by the following examples which are intended only to illustrate the invention.

EXAMPLE I

Ten grams of a catalyst consisting of 1.0% by weight palladium metal and 3.0% by weight potassium acetate supported on alumina with a surface area of 30 m²/g was put into a hard-glass reaction tube having an inner diameter of 10 mm, and a gaseous mixture consisting of butene-1, acetic acid, oxygen and nitrogen at a ratio of 30:20:10:40 (by volume) was continuously introduced into the reaction tube at a rate of 4.0 liters per hour. The reaction was conducted at 130°C. under atmospheric pressure. As a result, 1,4-diacetoxy-2-butene 1,4-diacetoxy-2-butene 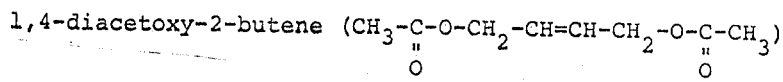

was formed at a rate of 42 g per liter of catalyst per hour (42g/liter of catalyst.hour). As other products, 3,4-diacetoxy-1-butene, 3-acetoxy-1-butene, 1-acetoxy-2-butene and 1-acetoxy-1,3-butadiene were formed at a rate of respectively .4g per liter of catalyst per hour, 18g per liter of catalyst per hour, 38g per liter of catalyst per hour and 27g per liter of catalyst per hour, and in the outlet gas was 0.5% by volume of carbon dioxide.

EXAMPLE II

Ten grams of a catalyst consisting of 1.0% by weight of palladium metal and 3.0% by weight of sodium acetate supported on a tablet of silica having a diameter of 3 millimeters and a height of 3 millimeters was put into the same reaction tube as used in Example I, and a gaseous mixture consisting of cis-butene-2, acetic acid and oxygen at a ratio of 75:20:5 (by volume) was continuously passed through the tube at a rate of 5 liters per hour, at 150°C. under atmospheric pressure. As a result, 1,4-diacetoxy-2-butene, 3,4-diacetoxy-1-butene, 3-acetoxy-1-butene, 1-acetoxy-2-butene and 1-acetoxy-1,3-butadiene were formed at a rate of respectively 56g per liter of catalyst per hour, 8g per liter of catalyst per hour, 39g per liter of catalyst per hour, 40g per liter of catalyst per hour and 35g per liter of catalyst per hour, and further, a trace amount of triacetate were formed. Outlet gas contained 1.1% by volume of carbon dioxide.

EXAMPLE III

Ten grams of the same catalyst as used in Example I was put into a hard-glass reaction tube having an inner diameter of 10 mm, and a gaseous mixture consisting of trans-butene-2, acetic acid, oxygen and nitrogen at a ratio of 20:20:15:45 (by volume) was continuously introduced into the reaction tube at a rate of 5.0 liters per hour. The reaction was carried out at 150°C. under atmospheric pressure. As a result, 1,4-diacetoxy-2-butene, 3,4-diacetoxy-1-butene, 3-acetoxy-1-butene, 1-acetoxy-2-butene and 1-acetoxy-1,3-butadiene were formed at a rate of respectively 82g per liter of catalyst per hour, 8g per liter of catalyst per hour, 43g per liter of catalyst per hour, 64g per liter of catalyst per hour and 22g per liter of catalyst per hour, and further, triacetate was formed at a rate of 10g per liter of catalyst per hour. The outlet gas contained 1.2% by volume of carbon dioxide.

EXAMPLE IV

Alumina beads of 3 millimeters in diameter (Neobead, sold under the trademark Neobead by Mizusawa Kagaky Kogyo Kabushiki, Kaisha, Japan) were calcined at 1,000°C. On said alumina were supported 1.0% by weight of palladium and 3.0% by weight of potassium acetate. Ten grams (10g) of the catalyst thus prepared was put into the same reaction tube as used in Example I, and a gaseous mixture consisting of butene-1, cis-ubtene-2, trans-butene-2, acetic acid, oxygen and nitrogen at a volume ratio of 5:5:5:20:15:50 was continuously introduced into the reaction tube at a flow rate of 4.0 liters per hour at 140°C. and under atmospheric pressure.

As a result, 1,4-diacetoxy-2-butene, 3,4-diacetoxy-1-butene, 3-acetoxy-1-butene, 1-acetoxy-2-butene and 1-acetoxy-1,3-butadiene were formed at a rate of respectively 70g per liter of catalyst per hour, 6g per liter of catalyst per hour, 39g per liter of catalyst per hour, 55g per liter of catalyst per hour and 30g per liter of catalyst per hour, and further triacetates were formed at a rate of 1.2g per liter of catalyst per hour. The outlet gas contained 1.0% by volume of carbon dioxide. The reaction gas containing these products was cooled to obtain a condensate, and then the condensate was subjected to distillation under a pressure of 3 mmHg, whereby water, acetic acid, 3-acetoxy-1-butene, 1-acetoxy-2-butene, 1-acetoxy-1,3-butadiene and the like were distilled out as overhead products, while a mixture of 1,4-diacetoxy-2-butene and 3,4-diacetoxy-1-butene was obtained as a bottoms product. 100 grams (100g) of the bottoms product was brought into a flask equiped with a steam-introducing tube and a Widmer spiral having a volume of 250cc, and then 2.5 grams of sulphuric acid and 100 grams of water were introduced into the flask. The mixture in the flask was heated at 90°–100°C. with stirring, which resulted in distilling out acetic acid and water. The reaction was carried out for 10 hours while continuously introducing steam into the flask in an amount corresponding to that of water distilled out of the flask. After the reaction, in the reaction liquid were contained 95 grams of water, 45 grams of 2-butene-1,4-diol, 4 grams of 1-butene-3,4-diol, 5 grams of 1,4-diacetoxy-2-butene, 0.5 gram of 3,4-diacetoxy-1-butene, 0.5 gram of acetic acid and 2.5 grams of sulphuric acid. The reaction liquid was then neutralized by adding a 0.1 N aqueous solution of sodium hydroxide. By distillation of the mixture thus prepared, 46 grams of 2-butene-1,4-diol was obtained.

EXAMPLE V

Ten grams of a catalyst consisting of 1.0% by weight of palladium supported on the same alumina as used in Example I was put into the same reaction tube as used in Example I, and a gaseous mixture consisting of butene-1, cis-butene-2, trans-butene-2, acetic acid and oxygen at a volume ratio of 20:20:20:30:10 was continuously introduced into the reaction tube at a flow rate of 3.0 liters per hour. The reaction was carried out at 130°C. under atmospheric pressure. As a result, 1,4-diacetoxy-2-butene, 3,4-diacetoxy-1-butene, 3-acetoxy-1-butene, 1-acetoxy-2-butene and 1-acetoxy-1,3-butadiene were formed at a rate of respectively 10g per liter of catalyst per hour, 0.9g per liter of catalyst per hour, 4.2g per liter of catalyst per hour, 5.3g per liter of catalyst per hour and 3.2g per liter of catalyst per hour.

EXAMPLE VI

Ten grams of a catalyst consisting of 1.0% by weight of palladium, 3.0% by weight of lithium acetate and 1.5% by weight of cadmium acetate supported on the same alumina as used in Example I was put into the same reaction tube as used in Example I, and a gaseous mixture consisting of butene-1, acetic acid, oxygen and nitrogen at a volume ratio of 30:20:10:40 was continuously introduced into the reaction tube at a flow rate of 4.0 liters per hour. The reaction was carried out at 150°C. under atmospheric pressure. As a result, 1,4-diacetoxy-2-butene, 3,4-diacetoxy-1-butene, 3-acetoxy-1-butene, 1-acetoxy-2-butene and 1-acetoxy-1,3-butadiene were formed at a rate of respectively 23, 2, 5, 15 and 16 grams per liter of catalyst per hour.

EXAMPLE VII

Ten grams of a catalyst consisting of 1.0% by weight of palladium and 3.0% by weight of potassium propionate supported on the same calcined alumina as used in Example IV was put into the same reaction tube as used in Example I, and a gaseous mixture consisting of butene-1, propionic acid, oxygen and nitrogen at a volume ratio of 15:20:15:50 was continuously introduced into the reaction tube at a flow rate of 5.0 liters per hour. The reaction was carried out at 150°C. under atmospheric pressure. As a result, 1,4-dipropionyloxy-2-butene

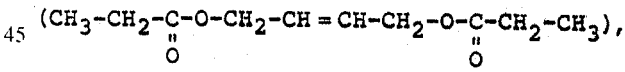

3,4-dipropionyloxy-1-butene, 3-propionyloxy-1-butene, 1-propionyloxy-2-butene and 1-propionyloxy-1,3-butadiene were formed at a rate of respectively 104, 10, 5, 70 and 40 grams per liter of catalyst per hour, and in the outlet gas was 1.3% by volume of carbon dioxide.

EXAMPLE VIII

Ten grams of the same catalyst as used in Example I was put into a reactor of stainless steel U-tube having an inner diameter of 12 millimeters, and a gas mixture consisting of butene-1, acetic acid, oxygen and nitrogen at a volume ratio of 10:5:5:80 was continuously introduced into the reactor at a flow rate of 3.0 liters per hour. The reaction was carried out at 130°C. under a pressure of 3 atmosphers. As a result, 1,4-diacetoxy-2-butene, 3,4-diacetoxy-1-butene, 3-acetoxy-1-butene, 1-acetoxy-2-butene, 1-acetoxy-1,3-butadiene an triesters were formed at a rate of respectively 88, 8, 34, 77, 56 and 3 grams per liter of catalyst per hour, and the outlet gas contained 1.5% by volume of carbon dioxide.

EXAMPLE IX

Into a three-necked flask having a volume of 200cc equipped with a cooling apparatus were brought 60 grams of acetic acid, 5 grams of potassium acetate and 10 grams of a catalyst which had been prepared by grinding the same catalyst as in Example V to fine particles having a particle size of 200–300 mesh. A gaseous mixture consisting of butene-1, cis-butene-2, trans-butene-2 and oxygen at a volume ratio of 30:30:30:10 were continuously introduced into the flask at a flow rate of 2.0 liters per hour while stirring the mixture in the flask. The reaction was carried out at 100°C. under atmospheric pressure for 10 hours. As a result, 1,4-diacetoxy-2-butene, 3,4-diacetoxy-1-butene, 3-acetoxy-1-butene, 1-acetoxy-2-butene and 1-acetoxy-1,3-butadiene were formed in an amount of respectively 4.5g, 0.3g, 1.2g, 3.6g and 3.2g. The outlet gas contained constantly 0.05% by volume during the reaction.

EXAMPLE X 10 grams of the same catalyst as used in Example I was put into the same reaction tube as used in Example I, and a gaseous mixture consisting of 1-acetoxy-2-butene, acetic acid, oxygen and nitrogen at a volume ratio of 30:20:10:40 was continuously introduced at a flow rate of 3 liters per hour into the reaction tube. The reaction was carried out at 140°C. under atmospheric pressure. As a result, 1,4-diacetoxy-2 butene, 3,4-diacetoxy-1-butene and 1-acetoxy-1,3-butadiene were formed at a rate of respectively 83, 10 and 6 grams per liter of catalyst per hour.

EXAMPLE XI 10 grams of the same catalyst as used in Example I were put into the same reactor as used in Example I, and a gaseous mixture consisting of 1-acetoxy-1,3-butadiene, acetic acid, oxygen and nitrogen at a volume ratio of 30:20:10:40 were continuously introduced into the reactor at a flow rate of 3 liters per hour. The reaction was carried out at 150°C. under atmospheric pressure. As a result, 1,4-diacetoxy-2-butene and 3,4-diacetoxy-1-butene were formed at a rate of respectively 55 and 5 grams per liter of catalyst per hour.

EXAMPLE XII 10 grams of the same catalyst as used in Example I were put into the same reactor as used in Example I, and a gaseous mixture consisting of butene-1, cis-butene-2, trans-butene-2, 1-acetoxy-2-butene, 1-acetoxy-1,3-butadiene, acetic acid and oxygen at a volume ratio of 15:15:15:15:10:20:10 was continuously introduced into the reactor at a flow rate of 5 liters per hour. The reaction was carried out at 150°C. under atmospheric pressure. As a result, 1,4-diacetoxy-2-butene, 3,4-diacetoxy-1-butene and 3-acetoxy-1-butene were formed at a rate of respectively 97,9 and 16 grams per liter of catalyst per hour, and 1-acetoxy-2-butene and 1-acetoxy-1,3-butadiene were further formed at a rate of respectively 26 and 12 grams per liter of catalyst per hour.

EXAMPLE XIII 10 grams of the same catalyst as used in Example II was put into the same reactor as used in Example I, and a gaseous mixture consisting of butene-1, cis-butene-2, trans-butene-2, 1-acetoxy-2-butene, 1-acetoxy-1,3-butadiene, acetic acid and oxygen at a volume ratio of 15:15:15:15:10:20:10 was continuously introduced into the reactor at a flow rate of 5 liters per hour. The reaction was carried out at 150°C. under atmospheric pressure. As a result, 1,4-diacetoxy-2-butene, 3,4-diacetoxy-1-butene and 3-acetoxy-1-butene were formed at a rate of respectively 64, 6 and 10 grams per liter of catalyst per hour, and 1-acetoxy-2-butene and 1-acetoxy-1,3-butadiene were further formed at a rate of respectively 26 and 16 grams per liter of catalyst per hour.

The reaction gas containing these products flowed out of the reactor was cooled to obtain a condensate, followed by distilling the condensate under reduced pressure to obtain a mixture of 1,4-diacetoxy-2-butene and 3,4-diacetoxy-1-butene as a bottoms product. 1-acetoxy-2-butene and 1-acetoxy-1,3-butadiene which were distilled out in the above distillation were recycled into the foregoing reaction together with acetic acid. 100 grams of the aforementioned bottoms product was mixed with 100 grams of water, and into the mixture was introduced 1 gram of sulphuric acid. The mixture was strongly stirred for three hours while refluxing. After the hydrolysis reaction, the reaction mixture was extracted three times using 50 grams of diisopropylether for one extraction. A residual solution (aqueous solution) was again heated for 3 hours while refluxing to carry out the reaction, and the reaction mixture was extracted three times using 50 grams of diisopropylether for one extraction. A mixture obtained by neutralizing the residual solution (aqueous solution) with sodium hydroxide contained 42 grams of diol-compounds, and by distilling this solution under reduced pressure, 38 grams of 2-butene-1,4-diol and 3 grams of 1-butene-3,4-diol were obtained.

EXAMPLE XIV

Ten grams of a catalyst consisting of 1.0% by weight of palladium and 3.0% by weight of potassium acetate supported on alumina with a surface area of 30 m²/g was put into a hard-glass reaction tube having an inner diameter of 10 millimeter, and a gaseous mixture consisting of 1,3-butadiene, acetic and oxygen at a volume ratio of 70:20:10 was continuously passed through the reaction tube at a flow rate of 3 liters per hour, at 130°C. under stmospheric pressure, whereby the reaction was performed.

As a result, 1,4-diacetoxy-2-butene, 3,4-diacetoxy-1-butene, and 1-acetoxy-1,3-butadiene were formed at a rate of respectively 25, 2.5 and 13 grams per liter of catalyst per hour, and the outlet gas contained 1.0% by volume of carbon dioxide.

EXAMPLE XV 10 grams of the same catalyst as used in Example XIV were put into the same reactor as used in Example XIV, and a gaseous mixture consisting of 1,3-butadiene, acetic acid, oxygen and nitrogen at a volume ratio of 20:15:20:45 continuously introduced into the reactor at a flow rate of 5 liters per hour whereby the reaction was carried out at 130°C., under atmospheric pressure. As a result, 1,4-diacetoxy-2-butene, 3,4-diacetoxy-1-butene and 1-acetoxy-1,3-butadiene were formed at a rate of respectively 50,4.8 and 19 gram per liter of catalyst per hour, and further triacetoxy-butanes were formed in a trace amount. The outlet gas contained 1.6% by volume of carbon dioxide.

EXAMPLE XVI 10 grams of a catalyst consisting of 1.0% by weight of palladium and 3.0% by weight of sodium acetate supported on silica (which was in a shape of tablet of 3 millimeters in diameter and height, and was prepared from commercial powdery silica) was put into the same reactor as used in Example XIV, and a gaseous mixture consisting of 1,3-butadiene, acetic acid and oxygen at a volume ratio of 70:20:10 was continuously introduced into the reactor at a flow rate of 3 liters per hour. The reaction was carried out at 150°C. under atmospheric pressure. As a result, 1,4-diacetoxy-2-butene and 1-acetoxy-1,3-butadiene were formed at a rate of respectively 40 and 18 grams per liter of catalyst per hour. The outlet gas contained 1.2% by volume of carbon dioxide.

EXAMPLE XVII 10 grams of a catalyst consisting of 1.0% by weight of palladium supported on alumina with a surface area of 30 m²/g were put into the same reactor as used in Example XIV, and a gaseous mixture consisting of 1,3-butadiene, acetic acid and oxygen at a volume ratio of 70:20:10 was continuously introduced into the reactor at a flow rate of 3 liters per hour. The reaction was carried out at 130°C. under atmospheric pressure. As a result, 1,4-diacetoxy-2-butene, 3,4-diacetoxy-1-butene and 1-acetoxy-1,3-butadiene were formed at a rate of respectively 5, 0.5 and 2.6 grams per liter of catalyst per hour.

EXAMPLE XVIII 10 grams of a catalyst consisting of 1.0% by weight of palladium, 3.0% by weight of litium acetate and 3.0% by weight of cadmium acetate supported on the same alumina as used in Example XIV were put into the same reactor as used in Example XIV, and a gaseous mixture consisting of 1,3-butadiene, acetic acid and oxygen at a volume ratio of 70:20:10 was continuously introduced into the reactor at a flow rate of 3 liters per hour. As a result, 1,4-diacetoxy-2-butene, 3,4-diacetoxy-1-butene and 1-acetoxy-1,3-butadiene were formed at a rate of respectively 6.3, 0.5 and 3.2 grams per liter of catalyst per hour.

EXAMPLE XIX

Alumina bead of 3 millimeters in its diameter (Neobead, tradename of the product of Mizusawa Kagaku Kogyo Kabushiki Kaisha, Japan) was calcined at 1,000°C. On said alumina were supported 1.0% by weight of palladium and 3.0% by weight of sodium acetate. 10 grams of the catalyst thus prepared was put into the same reactor as used in Example XIV, and a gaseous mixture consisting of 1,3-butadiene, acetic acid and oxygen at a volume ratio of 70:20:10 was continuously introduced into the reactor at a flow rate of 3 liters per hour. The reaction was carried out at 130°C. under atmospheric pressure.

As a result, 1,4-diacetoxy-2-butene, 3,4-diacetoxy-1-butene and 1-acetoxy-1,3-butadiene were formed at a rate of respectively 12, 1.0 and 7 grams per liter of catalyst per hour.

EXAMPLE XX 10 grams of a catalyst consisting of 1.0% by weight of palladium and 3.0% by weight of potassium propionate supported on the same alumina as used in Example XIX were put into the same reactor as used in Example XIV, and a gaseous mixture consisting of 1,3-butadiene, propionic acid, oxygen and nitrogen at a volume ratio of 20:20:15:45 was continuously introduced into the reactor at a flow rate of 5 liters per hour. The reaction was carried out at 150°C. under atmospheric pressure. As a result, 1,4-dipropionyloxy-2-butene, 3,4-dipropionyloxy-1-butene and 1-propionyloxy-1,3-butadiene were formed at a rate of respectively 67, 6.2 and 24 grams per liter of catalyst per hour, and tripropionyloxy-butenes were formed in a trace amount. The outlet gas contained 1.4% by volume of carbon dioxide.

EXAMPLE XXI 10 grams of the same catalyst as used in Example XIV was put into a reactor of stainless steel U-tube having an inner diameter of 12 millimeters, and a gaseous mixture consisting of 1,3-butadiene, acetic acid, oxygen and nitrogen at a volume ratio of 10:5:5:80 was continuously introduced into the reactor at a flow rate of 3 liters per hour. The reaction was carried out at 130°C. and under a pressure of 3 atmosphers. As a result, 1,4-diacetoxy-2-butene, 3,4-diacetoxy-1-butene and 1-acetoxy-1,3-butadiene were formed at a rate of respectively 52, 5 and 25 grams per liter of catalyst per hour, and further triacetoxybutenes were formed in a trace amount. The outlet gas contained 2.1% by volume of carbon dioxide.

EXAMPLE XXII

Into a three-necked flask having a volume of 200cc equipped with a cooling apparatus were brought 60 grams of acetic acid, 5 grams of potassium acetate and 10 grams of a catalyst which had been prepared by grinding the same catalyst as in Example XVII to fine particle having a particle xize of 200–300 mesh. A gaseous mixture consisting of 1,3-butadiene and oxygen at a volume ratio of 90:10 was continuously introduced into the said flask, and the reaction was carried out at 100°C. for 10 hours while stirring. As a result, 2.5 grams of 1,4-diacetoxy-2-butene and 0.5 grams of 1-acetoxy-1,3-butadiene were formed, and the outlet gas contained constantly 0.07% by volume of carbon dioxide during the reaction.

EXAMPLE XXIII 10 grams of the same catalyst as used in Example XIV was put into a glass reaction tube having an inner diameter of 10 millimeters, and liquid acetic acid containing 5% by weight of potassium acetate dissolved therein was continuously fed into the reactor from the top of the reactor at a flow rate of 15cc per hour and trickled on the catalyst preheated at 100°C. while a gaseous mixture consisting of 1,3-butadiene and oxygen at a volume ratio of 90:20 was continuously introduced from the top of the reactor downwardly at a flow rate of 1 liter per hour. The effluent gas was cooled to condense condensable components contained therein.

The concentration of 1,4-diacetoxy-2-butene in the resulting condensate was 0.15% by weight.

EXAMPLE XXIV 1-acetoxy-1,3-butadiene was separated from the mixture of reaction products obtained in Example XIV, and the vapor of said compound was mixed with acetic acid, oxygen and nitrogen at a mole ratio of 30:20:10:40. Using the same catalyst and apparatus as used in Example XIV, the reaction was conducted at 150°C. and under atmospheric pressure by introducing the aforementioned gaseous mixture at a flow rate of 3 liters per hour. As a result, 1,4-diacetoxy-2-butene and 3,4-diacetoxy-1-butene were formed at a rate of respectively 55 and 5 grams per liter of catalyst per hour.

EXAMPLE XXV

A distillate having a boiling temperature range of 100°–130°C. under atmospheric pressure was collected from the reaction products obtained by the same reaction as in Example I, and the distillate containing 45 mole % of 1-acetoxy-1,3-butadiene was recycled to the reaction as a reactant. The reaction was carried out at 150°C. under atmospheric pressure, using the same catalyst and apparatus as used in Example XIV, by introducing a gaseous mixture consisting of 1,3-butadiene, the aforementioned distillate containing 1-acetoxy-1,3-butadiene, acetic acid and oxygen at a volume ratio of 50:20:20:10 at a flow rate of 5 liters per hour.

As a result, 1,4-diacetoxy-2-butene and 3,4-diacetoxy-1-butene were formed at a rate of respectively 85 and 7 grams per liter of catalyst per hour, and 1-acetoxy-1,3-butadiene was additionally formed at a rate of 15g per liter of catalyst per hour. A trace amount of triesters was also produced. The outlet gas contained 1.5% by volume of carbon dioxide.

EXAMPLE XXVI 10 grams of a catalyst consisting of 1.0% by weight of palladium and 3.0% by weight of potassium acetate supported on an alumina having a surface area of 30 m²/g were put into a hard-glass reaction tube having an inner diameter of 10 millimeters, and a gas mixture consisting of 1,3-butadiene, acetic acid and oxygen at a volume ratio of 70:20:10 was introduced into the reaction tube at a flow rate of 5 liters per hour. The reaction was carried out at 150°C. under atmospheric pressure. As a result, 1,4-diacetoxy-2-butene, 3,4-diacetoxy-1-butene and 1-acetoxy-1,3-butadiene were formed at a rate of respectively 60, 5 and 25 grams per liter of catalyst per hour. The outlet gas contained 1.5% by volume of carbon dioxide.

The reaction gas containing these products was cooled to obtain a condensate, and thereafter water, acetic acid, 1-acetoxy-1,3-butadiene and the like were distilled out of the condensate by heating the condensate, whereby a mixture of 1,4-diacetoxy-2-butene and 3,4-diacetoxy-1-butene was obtained as a bottoms product. 100 grams of the mixture was brought into a flask having a volume of 250cc equipped with a steam-introducing tube and a Widmer spiral, and hten 2.5 grams of sulphuric acid and 100 grams of water were introduced into the flask. The mixture in the flask was heated at 90°–100°C. with stirring, which resulted in distilling out acetic acid and water. The reaction was carried out for 10 hours while adding steam into the flask in an amount corresponding to that of water distilled out of the flask. In the liquid reaction mixture were contained 88 grams of water, 44 grams of 2-butene-1,4-diol, 4 grams of 1-butene-3,4-diol, 5 grams of 1,4-diacetoxy-2-butene, 0.5 grams of acetic acid and 2.5 grams of sulphuric acid. Then, the liquid reaction mixture was neutralized by adding a 0.1 N aqueous solution of sodium hydroxide. By distillating the mixture thus prepared under reduced pressure, 45 grams of 2-butene-1,4-diol was obtained.

EXAMPLE XXVII 10 grams of a catalyst consisting of 1.0% by weight of palladium and 3.0% by weight of sodium acetate supported on silica (which was in a shape of tablet of 3 millimeters in its diameter and height, and was prepared from commercial powdery silica) was put into the same reactor as used in Example XIV, and a gaseous mixture of raw materials having the same composition as used in Example XXV was introduced into the reactor at a flow rate of 5 liters per hour. The reaction was carried out at 150°C. under atmospheric pressure. As a result, 1,4-diacetoxy-2-butene, 3,4-diacetoxy-1-butene and 1-acetoxy-1,3-butadiene were formed at a rate of respectively 75, 7 and 17 grams per liter of catalyst per hour.

The reaction gas containing these products was cooled to obtain a condensate, and thereafter by distilling the condensate, a mixture consisting of 1,4-diacetoxy-2-butene and 3,4-diacetoxy-1-butene was obtained as a bottoms product. Monoacetoxybutadiene and monoacetoxybutene were recycled to the reaction together with unreacted acetic acid. 100 grams of the above-mentioned bottoms product and 100 grams of water were mixed together, and into the mixture was introduced 1 gram of sulphuric acid. While strongly stirring the mixture, the reaction was carried out over a 3-hour period of refluxing. After the reaction, the reaction mixture was extracted three times using 50 grams of diisopropylether for one extraction. A residual solution (aqueous phase) was again heated over a 3-hour period of refluxing to carry out the hydrolysis completely, and the reaction mixture was extracted three times using 50 grams of diisopropylether for one extraction. The mixture obtained by neutralizing the residual solution (aqueous phase) with sodium hydroxide contained 42 grams of diol-compounds, and by distilling this solution under reduced pressure, 38 grams of 2-butene-1,4-diol and 3 grams of 1-butene-3,4diol were obtained.

EXAMPLE XXVIII

Using the same catalyst and apparatus as used in Example XIV, the reaction was carried out at 130°C. under atmospheric pressure by passing a gaseous mixture consisting of butadiene, acetic acid, oxygen and nitrogen through the reactor. The concentrations of acetic acid and oxygen in the gaseous mixture were respectively 15% and 20% by volume, and the concentrations of butadiene and nitrogen were varied as shown in Table 1. The results are shown in Table 1.

TABLE 1

| No. | CONCENTRATION | | Formation Rate of 1,4-diacetoxy-1-butene (g/liter of catalyst/hour) | | |
|---|---|---|---|---|---|
| | BUTADIENE (%) (by volume) | NITROGEN (%) (by volume) | after 1 hour | after 2 hours | after 3 hours |
| 1 | 3 | 62 | 36 | 36 | 35 |
| 2 | 5 | 60 | 51 | 51 | 50 |

TABLE 1-Continued

| No. | CONCENTRATION BUTADIENE (%) (by volume) | NITROGEN (%) (by volume) | Formation Rate of 1,4-diacetoxy-1-butene (g/liter of catalyst/hour) after 1 hour | after 2 hours | after 3 hours |
|---|---|---|---|---|---|
| 3 | 10 | 55 | 58 | 57 | 55 |
| 4 | 20 | 45 | 50 | 45 | 38 |
| 5 | 30 | 35 | 43 | 39 | 31 |
| 6 | 65 | 0 | 38 | 30 | 21 |

EXAMPLE XXIX

Using the same catalyst and apparatus as used in Example XIV, the reaction was carried out at 135°C. under atmospheric pressure by introducing a gaseous mixture consisting of BB-fraction, acetic acid, oxygen and nitrogen at a volume ratio of 20:15:20:45 at a flow rate of 5 liters per hour. The BB-fraction contained butane, 1-butene, 2-butene, isobutene, butadiene and hydrocarbons having more than 5 carbon atoms at a volume ratio of respectively 4, 11, 6, 19, 56 and 4%. As a result, 1,4-diacetoxy-2-butene, 3,4-diacetoxy-1-butene and 1-acetoxy-1,3-butadiene were formed at a rate of respectively 48, 3 and 15 grams per liter of catalyst per hour, and triacetoxybutenes and monoacetoxybutenes were formed in trace amounts.

EXAMPLE XXX

The reaction procedures in Example XV were repeated except that nitrogen contained in the feed gaseous mixture was substituted partly or wholly with steam. The result is shown in Table 2.

TABLE 2

| Number | Concentration of steam in feed gas (% by volume) | Formation rate of 1,4-diacetoxy-2-butene (g/liter of catalyst hour) After 2 hours | After 15 hours | After 24 hours |
|---|---|---|---|---|
| 7 | 0 | 50 | 45 | 38 |
| 8 | 5 | 51 | 49 | 46 |
| 9 | 10 | 53 | 53 | 53 |
| 10 | 15 | 50 | 50 | 50 |
| 11 | 20 | 47 | 47 | 47 |
| 12 | 30 | 42 | 42 | 42 |
| 13 | 45 | 39 | — | 39 |

What is claimed is:

1. A method for preparing 1,4-diacyloxy-2-butene which comprises reacting in the gaseous phase at a temperature of 100°–160°C. 1-acyloxy-1,3-butadiene with a carboxylic acid and oxygen in the presence of an effective amount of a catalyst consisting of metallic palladium.

2. A method according to claim 1 wherein an alkali metal salt of a carboxylic acid selected from the group consisting of lithium acetate, lithium propionate, lithium butyrate, sodium acetate, sodium propionate, sodium butyrate, potassium acetate, potassium propionate and potassium butyrate is used as a promoter.

3. A method for preparing 1,4-diacyloxy-2-butene wherein butadiene is reacted in the gaseous phase at a temperature of 100°–160°C. with a carboxylic acid and oxygen in the presence of an effective amount of a catalyst consisting of metallic palladium to obtain the product 1,4-diacetoxy-2-butene and 1-acyloxy-1,3-butadiene as a by-product, recycling the 1-acyloxy-1,3-butadiene and unreacted carboxylic acid to the reaction system wherein the 1-acyloxy-1,3-butadiene is simultaneously converted to 1,4-diacyloxy-2-butene.

4. A method according to claim 3, wherein an alkali metal salt of a carboxylic acid selected from the group consisting of lithium acetate, lithium propionate, lithium butyrate, sodium acetate, sodium propionate, sodium butyrate, potassiumm acetate, potassium propionate and potassium butyrate is used as a promoter.

* * * * *